April 26, 1932.  G. H. KETCHUM  1,855,636
BRAKE
Filed Nov. 6, 1929

Inventor
George H. Ketchum;
By Marcus G. Smith
Attorney

Patented Apr. 26, 1932

1,855,636

UNITED STATES PATENT OFFICE

GEORGE H. KETCHUM, OF HUNTINGTON PARK, CALIFORNIA

BRAKE

Application filed November 6, 1929. Serial No. 405,174.

My invention relates generally to brakes and particularly to brakes that are utilized for heavy duty, for instance, in connection with deep well drilling rigs, wherein the apparatus including the brake, is subjected to the strains developed by the relatively heavy weight of the drill string within the well hole.

The principal objects of my invention are, to minimize and eliminate, insofar as possible, the heat developed as a result of the application of the brake band to the drum, to mount the brake lining or friction producing material upon the surface of the drum instead of on the brake band as is the usual practice, which arrangement, to a large extent, insulates the drum from the high temperatures produced as a result of application of the brake band to the drum and further, to provide simple and efficient means for effecting a comparatively rapid dissemination of the heat produced in the brake band while the same is in service.

Further objects of my invention are, to generally improve upon and simplify the construction of the existing forms of brakes and particularly the brakes utilized in connection with deep well drilling rigs, further, to provide a brake and brake cooling apparatus that is relatively simple in construction, inexpensive of manufacture and capable of being advantageously employed in connection with heavy duty brakes and further, to provide a construction wherein the brake drum is not subjected to the comparatively rapid wear and high temperatures that are incident to the brakes and brake drums now in general use.

With the foregoing and other objects in view, my invention consists in certain novel features of construction and arrangement of parts that will hereinafter be more fully described and claimed and illustrated in the accompanying drawings, in which:

Figure 1:
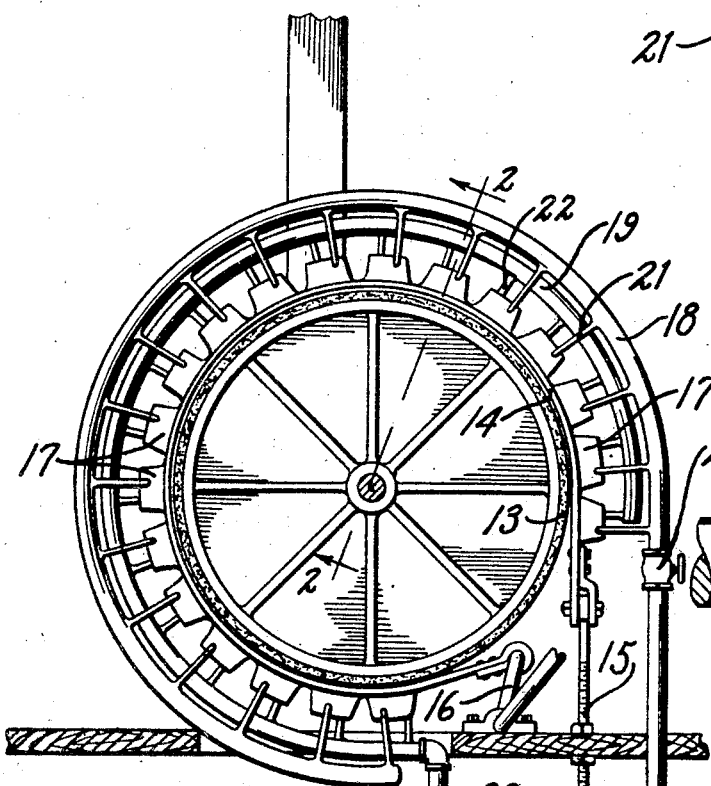
Fig. 1 is a side elevational view of a brake embodying the principles of my invention.
Figure 2:
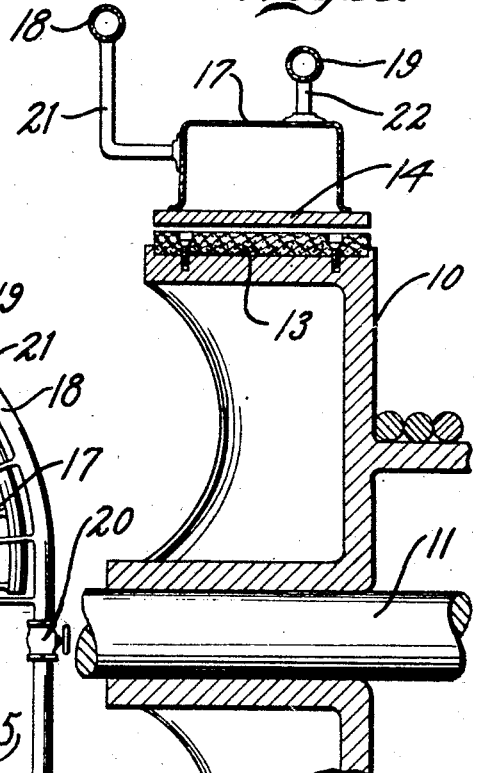
Fig. 2 is an enlarged detail section taken approximately on the line 2—2 of Fig. 1.
Figure 3:
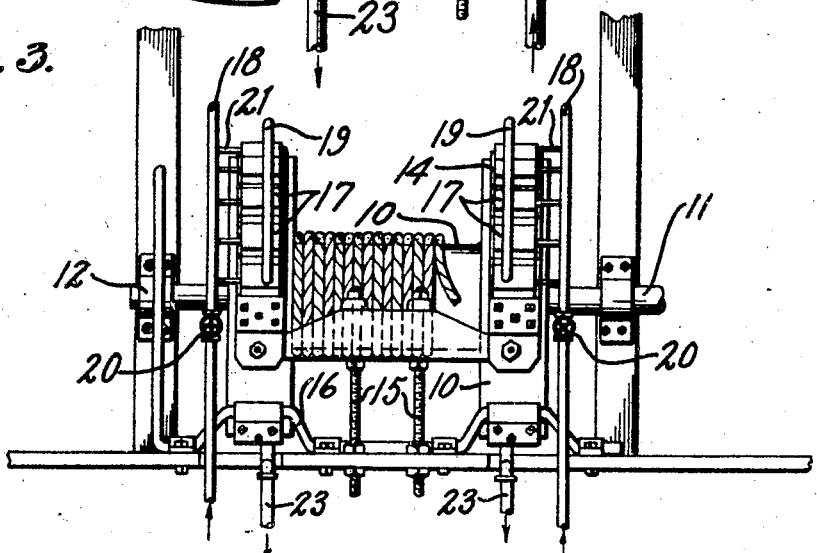
Fig. 3 is a front elevational view of a brake constructed in accordance with my invention and of the type that is adapted for use in connection with deep well drilling rigs.

Referring by numerals to the accompanying drawings which illustrate the practical embodiment of my invention, 10 designates a conventional form of brake drum that is carried by a shaft 11, the latter being journaled in suitable bearings 12 and in accordance with my invention the brake lining 13 on friction producing member 14 usually composed of asbestos or asbestos composition having wires or wire mesh imbedded therein, is firmly secured in any suitable manner, preferably by means of screws or rivets to the periphery of the drum.

Surrounding the brake drum is a brake band 14 of resilient metal, one end of which is suitably anchored, preferably by means of bolts 15 to the derrick floor or other fixed object and the opposite end of this brake band is connected to a short crank arm 16.

Secured in any suitable manner to the outer face of the brake band is a series of small metal housings 17 and disposed adjacent to said housings are pipes 18 and 19.

Pipe 18 is connected to a suitable source of cooling fluid supply, preferably water and located in said pipe adjacent to the brake is a valve 20. Relatively small branch pipes 21 connect pipe 18 with the respective housings 17 and relatively small branch pipes 22 connect said housings with pipe 19.

One end of pipe 19 is closed in any suitable manner and the opposite end communicates with a waste pipe 23. The pipes 18 and 19 are approximately equal in length and they also aproximately equal the length of the effective braking surface of the resilient band 14.

As a result of this circulation of fluid cooling medium through the housings 17, the heat developed in the brake band, when the same is applied to the brake drum, will be rapidly disseminated and as a result neither the brake band nor the brake drum will become heated to such a degree as to prevent them from functioning in the desired manner.

Inasmuch as the brake lining or friction producing member 13 is applied to the surface of the drum instead of to the brake band as is the usual practice, the rim or wall of the drum is prevented from absorbing the relatively high degree of heat that is developed when the brake is applied, for the brake lining acts as an insulator and the greater portion of the heat produced in service is absorbed by the brake band and this heat is rapidly disseminated by the cooling fluid that circulates through the housings 17.

It will be noted that pipe 18 is connected at one end only to the supply pipe and that pipe 19 is connected at one end only to the waste pipe so that both pipes, due to their inherent resiliency are free to move the required short distance to follow the brake band when the same is applied to or released from contact with the brake drum.

In brakes, and particularly those used for heavy duty and where the brake lining is carried by the brake band, the drum, and particularly the rim portion thereof, very frequently becomes warped and broken as a result of the relatively high temperatures developed while the brake is in service and further, the efficiency of the brake is impaired for the reason that when the brake drum becomes highly heated the metal in the rim portion thereof tends to flow so that irregular grooves are produced on the surface of the drum.

My improved construction entirely overcomes these undesirable results inasmuch as the brake lining, when applied to the surface of the drum, functions as an insulator therefor and prevents said drum from becoming unduly heated and the circulating cooling medium very rapidly carries off the heat that is produced in the brake band when the same is applied so that said band is always in condition to give maximum braking effect when applied to the lining carried by the drum.

One of the especially desirable advantages of my improved brake is the measure of safety afforded to life and property, resulting from bursting of the brake drum due to overheated conditions, for where my improved brake cooling arrangement is provided it is impossible for the drum to become heated to such a degree as to crack or fracture and burst. This condition is brought about by locating the brake lining upon the surface of the drum so that said lining acts as a heat insulator and the arrangement of the cooling chambers on the brake band which rapidly disseminates the heat developed when the brake band is applied to the drum.

Thus it will be seen that I have provided a heavy duty brake and brake cooling apparatus that is relatively simple in construction, inexpensive of manufacture and very effective in performing the functions for which it is intended.

It will be understood that minor changes in the size, form and construction of the various parts of my improved brake may be made and substituted for those herein shown and described without departing from the spirit of my invention, the scope of which is set forth in the appended claims.

I claim as my invention:

1. In a brake, a drum, a layer of brake lining secured to the periphery of said drum, a brake band surrounding said drum, a series of relatively small housings secured to the outer face of said brake band, which series of housings extend practically throughout the entire length of said brake band, a water supply pipe surrounding and spaced apart from said brake band and housings, branch pipes leading from said water supply pipe respectively to said housings, a second pipe surrounding said brake band and series of housings and branch pipes leading from said housings to said second pipe.

2. In a brake, a drum, a layer of brake lining secured to the periphery of said drum, a brake band surrounding said drum, a series of relatively small housings secured on the outer face of said brake band and means for effecting separate circulation of cooling fluid through said housings.

3. In a brake, a drum, a layer of brake lining applied to the periphery of said drum, a brake band surrounding said drum, a series of relatively small housings secured on the outer face of said brake band, separate means for supplying cooling fluid to each housing and a separate cooling fluid outlet for each housing.

4. In a brake, a drum, a brake band surrounding said drum, a series of relatively small housings secured on the outer face of said band and each housing being provided with a separate cooling fluid inlet and a cooling fluid outlet.

In testimony whereof I affix my signature.

GEORGE H. KETCHUM.